Willard and Ross
Mower.
No 1779 Reissued. Sep. 27. 1864.
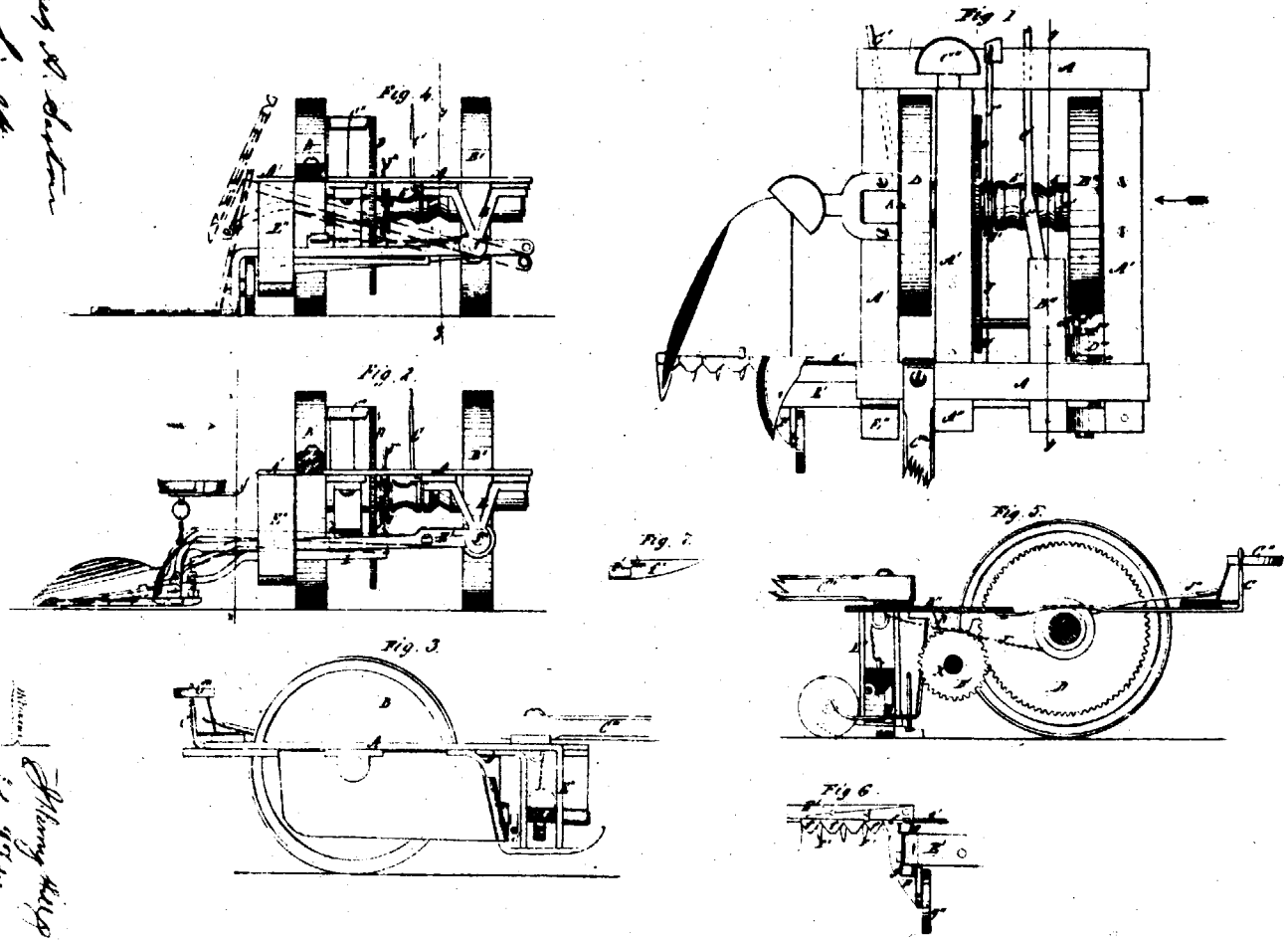
James A. Sexton
By his Attorney
Thos. W. Dodge
Witnesses:
J. Henry Hill
Edgar T. Dodge

UNITED STATES PATENT OFFICE.

JAMES A. SAXTON, OF CANTON, OHIO, ASSIGNEE, BY MESNE ASSIGNMENTS, OF HOSEA WILLARD AND ROBERT ROSS.

IMPROVEMENT IN HARVESTERS.

Specification forming part of Letters Patent No. 18,362, dated November 3, 1857; Reissue No. 1,779, dated September 27, 1864.

*To all whom it may concern:*

Be it known that HOSEA WILLARD, of Vergennes, in the county of Addison and State of Vermont, and ROBERT ROSS, formerly of same place, but now residing at St. Albans, in the county of Franklin, in said State, invented certain new and useful improvements in Grain and Grass Harvesting Machines, of which the following is a full, clear, and exact description, reference being had to the accompanying drawings, which make a part of this specification, and in which—

Figure 1 is a plan or top view, showing one mode of applying said improvements when the machine is to be used as a reaper. Fig. 2 represents a front view of Fig. 1, with the leading wheel removed to show the parts in rear of it more fully, the coupling-arm, finger-beam, and platform being shown in different positions to illustrate the flexible connection of the finger-beam with the machine. Fig. 3 represents a section and side view on line *x x*, Fig. 2, when the parts are in the position shown in black lines. Fig. 4 represents in black lines a front view of the machine when arranged for mowing, and in blue and red lines two of the different positions which the finger-beam and cutting apparatus are made to assume when being prepared or folded for transportation. Fig. 5 represents a section on lines *y y*, Figs. 1 and 4, when the machine is arranged for moving, as shown in black lines, Fig. 4. Fig. 6 represents a plan or top view of finger bar or beam F′, shoe F, leading-wheel *g″*, and part of the coupling-arm or finger-bar extension-piece E′; and Fig. 7 represents a side view of one of the fingers and an end or cross-section of the finger bar or beam, showing how a part of the finger is made to rise up by the front edge of the bar to keep the cutter-bar from working forward.

The side of the machine which runs next to the standing grain I call the "inside," and that which runs next to the cut grass or grain I call the "outside."

In the accompanying drawings, the main frame, which is of rectangular form, is represented by the letters A A A′ A′. To the under side of the parts A′ A′ are fastened the bearings of the main shaft or journal of the driving and supporting wheels B B′. To the inner hub of the latter is fastened a ratchet wheel or device, *a′*, while a similar ratchet device, *a*, is fastened to the outer hub or side of wheel B. Wheels B B′, with their hub-ratchets, are fitted loosely on shaft X. A sliding ratchet wheel or device, *b′*, works on shaft X, and is so connected therewith as to be revolved when said shaft revolves, but is susceptible of a lateral movement, so that it can be moved in and out of action with ratchet *a′* by means of pin *c′* in lever C, whose front end is pivoted to the under side of piece B″, fastened to the front of the frame. Pin *c′* fits into a groove turned in the part *b′*, so that the part *b′* operates like a sliding revolving clutch. A similar ratchet or clutch, *b*, is fitted, to be worked by lever *c*, on the outside of wheel B.

C″ is the driver's seat, which is fastened to the rear of main frame, and in such a position as that levers C and C′ are both within his reach.

As the machine is drawn forward by tongue C‴, shown in section, wheels B B′ revolve, and when both or either of the clutches *b b′* are in action with their respective ratchets *a a′* shaft X is caused to revolve, together with cog-wheel D, fastened thereto, and which gears into cog-wheel D′ on a shaft, X′, supported at one end by hanger D″, depending from piece A″, and at the other in a projection, *d*, from D‴, in which the short crank-shaft turns, the latter ter having on its rear end a bevel-gear, *d″*, which is operated by bevel-gear *d′* on the end of shaft X′.

On the front end of the crank-shaft is fitted a balance-wheel, *e*, with a crank-pin, upon which is placed the outer end of the pitman *e′*, which gives motion to the cutter-bar *e″*, to which are attached teeth *f*, which work as they vibrate through slotted open fingers *f′*.

The improvements which form the subject-matter of this patent relate to that class of machines which have a yielding finger-beam and two independent driving-wheels; and the nature of the invention consists, first, in the arrangement of the draft beam or tongue, the main driving and bearing wheels, and two supports to the finger-bar extension or coupling-piece, whereby the draft will be on a line between the outer wheel and inner or sliding support; second, in so combining and connecting the finger bar or beam with a main frame having two independent driving-wheels that the heel end of the finger-beam or the shoe which supports it will have a sliding support, which will permit of the rising up to a certain extent of the heel end of the finger-beam without canting up the inner side of the main frame and the inner driving-wheel; third, in the combination, in a mowing-machine, of the following elements, viz.: a main frame, two independent supporting and driving wheels, and a finger bar or beam having two supports, one of which is a metallic loop, which permits it to rise and fall independently of the wheel or wheels or main frame or the main frame independently of the finger-bar.

C''' represents a portion of the draft-beam, showing its relative position as respects the parts of the machine above named.

To afford the finger bar or beam F' to which the fingers *f'* are attached a proper support at the side of the machine, while leaving it free to conform in a great measure to the slight inequalities in the ground by simply being drawn over them, and at the same time allowing the main driving-wheels to bear their proper portion of the strain when running on level ground, and also leaving them or either of them free to conform to the inequalities of the ground to operate the cutters when the machine or either side thereof is advancing, the heel of said finger bar or beam is fastened to a shoe, F, having lugs *g g* cast on its upper surface, between which is hinged one end of a coupling-piece, E', which curves up and extends or passes through a metallic loop, E'', fastened to the under side of the front corner of the main frame, thence along and is hinged at *f''*, to a hanger, E, fastened to the front outer corner of the main frame, as fully shown in black lines, Fig. 4, loop E'', allows the coupling or finger bar extension-piece E' to slide up and down, while at the same time it keeps the finger-beam in proper position, and prevents it from being twisted back when the machine is in operation.

By the above connection of the finger bar or beam it can rise at either end or bodily, independent of the up-and-down motion of the main frame. Consequently when the heel of the finger-beam passes over elevations it does not cant up the inner side of the main frame or the inner drive-wheel, B. Again, should wheel B happen to run over an elevation, and thus suddenly elevate the inner side of the frame, loop E'' permits the rise without its seriously affecting the heel of the finger-beam. By the arrangement of the tongue, as shown, the strain due to moving forward the finger bar or beam comes on both sides of the line of draft, thus equalizing the strain on the machine, and also in such a manner that each wheel is made to bear a due proportion of the strain and work.

When it is necessary to raise the finger-bar entirely off the ground to pass over large obstructions, it is effected by the driver from his seat by means of lever I, chain J, pulley J', and lever J'', as fully set forth in other patented divisions of even date herewith, in which the various parts of the machine, represented in the accompanying drawings, are more fully described, and to which reference can be had.

So much of the machine having now been described as is deemed necessary to illustrate the improvements covered by this patent and show one mode of applying the same to practical use, what is claimed under this patent as the invention of the said WILLARD and ROSS is—

The arrangement of the draft or tongue, the main driving and bearing wheels, and the two supporters to the finger-bar extension-piece, substantially as described, whereby the line of draft through the tongue will be on a line between the two supporters, and also on a line between the outer wheel and inner or sliding loop-support to render the machine more evenly balanced and the various parts less liable to give way.

In witness whereof I have hereunto subscribed my name.

JAMES A. SAXTON.

In presence of—
GEO. E. BALDWIN,
SAMUEL SURBURG.